(12) United States Patent
Lai et al.

(10) Patent No.: US 8,306,333 B2
(45) Date of Patent: Nov. 6, 2012

(54) METHOD AND SYSTEM FOR AUTOMATIC FIGURE SEGMENTATION

(75) Inventors: Shang Hong Lai, Hsinchu (TW); I Ting Tsai, Tainan (TW); Szu Hao Huang, Taipei (TW)

(73) Assignee: National Tsing Hua University, Hsinchu (TW)

( * ) Notice: Subject to any disclaimer, the term of this patent is extended or adjusted under 35 U.S.C. 154(b) by 391 days.

(21) Appl. No.: 12/640,243

(22) Filed: Dec. 17, 2009

(65) Prior Publication Data

US 2011/0150337 A1 Jun. 23, 2011

(51) Int. Cl.
*G06K 9/20* (2006.01)
*H04N 9/74* (2006.01)
*H04N 5/272* (2006.01)

(52) U.S. Cl. .... 382/190; 382/283; 348/586; 348/E5.058

(58) Field of Classification Search ................. 382/190, 382/283; 348/E5.058, 586, 587, 578, 571, 348/584, 597, 581; 352/85, 44, 38, 46, 53; 345/419, 421, 422, 418, 581, 589; 358/443, 358/448, 464

See application file for complete search history.

(56) References Cited

U.S. PATENT DOCUMENTS

| 7,676,081 | B2* | 3/2010 | Blake et al. | 382/164 |
| 7,885,463 | B2* | 2/2011 | Zhang et al. | 382/173 |
| 2007/0237393 | A1* | 10/2007 | Zhang et al. | 382/173 |
| 2010/0208987 | A1* | 8/2010 | Chang et al. | 382/165 |
| 2011/0075921 | A1* | 3/2011 | Sun et al. | 382/164 |

* cited by examiner

*Primary Examiner* — Sheela Chawan
(74) *Attorney, Agent, or Firm* — WPAT, P.C.; Anthony King

(57) ABSTRACT

A method for achieving segmentation of a picture according to one aspect of the present invention comprises: determining a first foreground of a picture based on a predetermined mask; applying Gaussian Mixture Models with weighted data (GMM-WD) to the first foreground to generate a second foreground; determining a first background of the picture based on the second foreground; applying the GMM-WD to the first background to generate a second background; and determining an unknown region based on the second background and the second foreground.

18 Claims, 4 Drawing Sheets

METHOD AND SYSTEM FOR AUTOMATIC FIGURE SEGMENTATION

BACKGROUND OF THE INVENTION (A) Field of the Invention

The present invention relates to a method of performing automatic figure segmentations on pictures of animals or other life forms, and more particularly, relates to a method of performing automatic segmentations applicable to said pictures by segmenting the image into a corresponding tri-map of foreground, background, and unknown regions.

(B) Description of the Related Art

Image segmentation and matting are hot topics in the areas of computer vision and pattern recognition, due to their potential applications in background substitution, general object recognition, and content-based retrieval. Static images, unlike the objects in video, lack temporal correlation between consecutive frames and thus make the problems severely under-constrained. Therefore, user interaction, such as scribble interface, is usually required to produce a complete labeling of the pixels.

Single-image matting approach is one of the typical approaches for static image segmentation. This approach assumes that intensity of each $(x_i, y_i)$-th pixel in an input image is a linear combination of a foreground color F and a background color $B_i$, and intensity may be calculated as:

$$I_i = \alpha_i F_i + (1-\alpha_i) B_i,$$

where $\alpha i$ is referred to as the pixel's partial opacity value or alpha matte. For each pixel in a color image, there are 3 compositing equations in 7 unknowns. The natural image matting, however, poses no restrictions on the background and is inherently under-constrained. In order to resolve the problem, the user is required to provide some additional information in the form of a tri-map or a set of brush strokes (scribbles). Accordingly, automatic segmentation is not attainable for such method.

SUMMARY OF THE INVENTION

A method for achieving segmentation of a picture according to one aspect of the present invention comprises: determining a first foreground of a picture based on a predetermined mask; applying Gaussian Mixture Models with weighted data (GMM-WD) to the first foreground to generate a second foreground; determining a first background of the picture based on the second foreground; applying the GMM-WD to the first background to generate a second background; and determining an unknown region based on the second background and the second foreground.

Another aspect of the present invention provides a method of processing an image matting of a picture comprising: identifying a foreground of the picture; identifying a background of the picture; applying Gaussian Mixture Models with weighted data (GMM-WD) to the foreground and the background to generate a second foreground and a second background; identifying an unknown region by excluding the second foreground and the second background from the picture; and performing an image matting process based on the second foreground, the second background, and the unknown region.

Another aspect of the present invention provides a system of automatic generation of a tri-map of a picture comprising: a measure for identifying a first foreground of the picture based on a predetermined mask; a measure for identifying a first background of the picture based on the predetermined mask; a measure for applying Gaussian Mixture Models with weighted data (GMM-WD) to the first foreground and the first background to generate a second foreground and a second background; a measure for identifying an unknown region by excluding the second foreground and the second background from the picture.

The foregoing has outlined rather broadly the features of the present invention in order that the detailed description of the invention that follows may be better understood. Additional features of the invention will be described hereinafter, and form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

DETAILED DESCRIPTION OF THE INVENTION

The present invention is related to a method of performing automatic figure segmentation on pictures of animals or other life forms by segmenting the picture into a corresponding tri-map comprising foreground, background, and unknown regions. For a better understanding of the present invention, the steps and the composition are disclosed in the following discussion. Ordinary skills are not disclosed so that unnecessary limitations on the present invention are avoided. The disclosure of the preferred embodiments is to help those skilled in the art to understand the present invention. Accordingly, the scope of the present invention shall not be limited to embodiments disclosed but shall be properly determined by the claims as set forth below.

Figure 1:
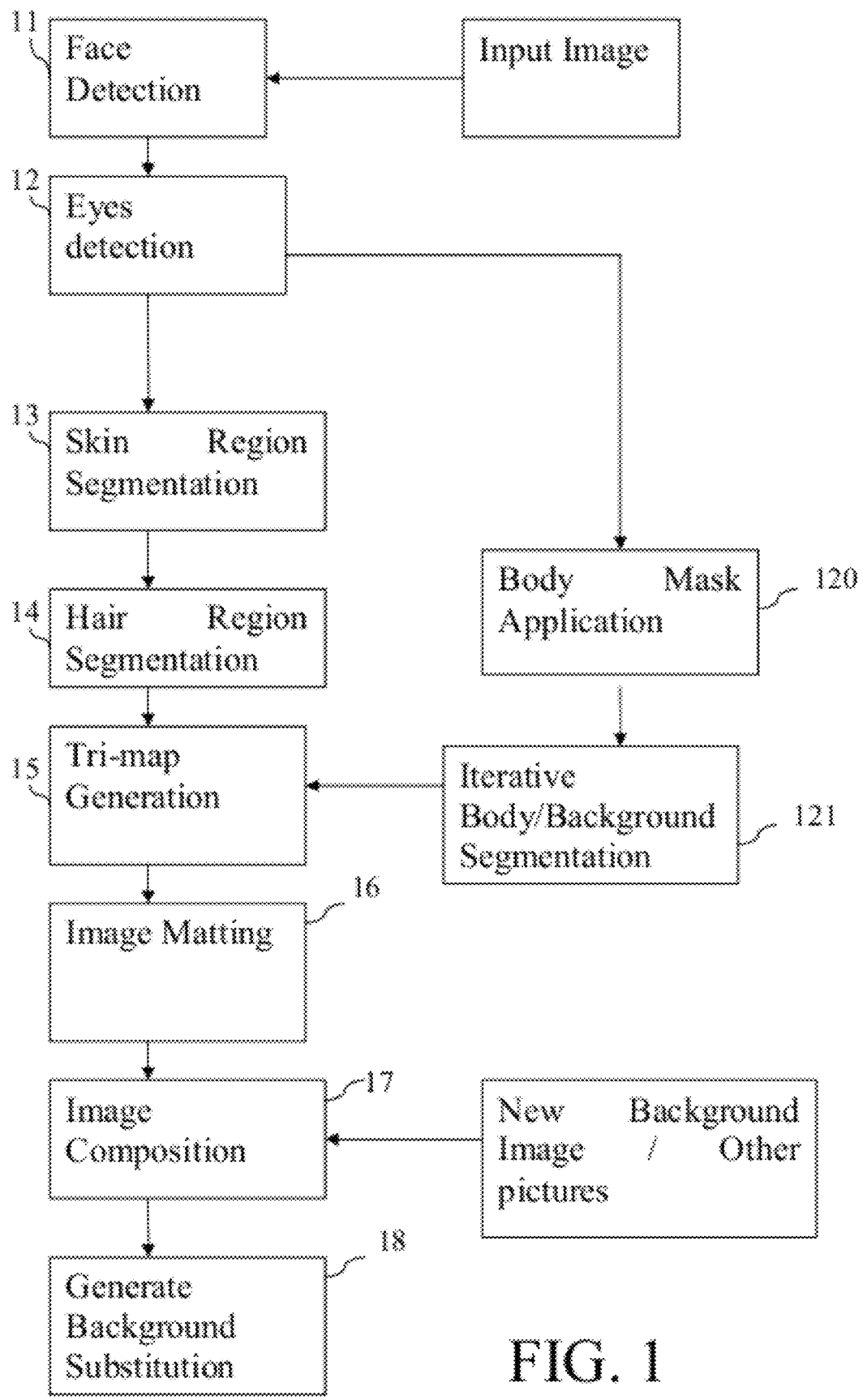
FIG. 1 illustrates the flow chart of one embodiment of the present invention.

FIG. 1 illustrates one embodiment of the present invention for performing automatic figure segmentation on pictures of animals or other life forms. The face detection 11 applies a face detection algorithm to the pictures. The face detection automatically identifies a face window from the digital image of the picture by comparing selected facial features from the picture and from that of a facial database. An adaBoost Face detection algorithm may be adopted to implement the facial identification.

Eye detection 12 applies an eye detection algorithm applied to the determined facial region of the input image based on a classifier and a facial mask to detect eyes. In one preferred embodiment, the eye detection 12 is based on the method proposed by Castrillon. The classifiers and the facial mask are trained based on training sets, and the results are stored in the facial database.

By comparing the stored facial mask with the input image, along with the face detection and the eye detection of the input image, the stored facial mask can be normalized or rescaled and a face region of the input image can be determined. For example, when the input image is of a human, the average eye width based on the training sets for humans is 89.4 millimeters and the average face height is 121.3 millimeters. Accordingly, the eye width is 89.4/121.3 of the face height. Assuming the center of the detected eye rectangle as Naison (n), the point in the middle of both the nasal root and the nasofrontal suture, the face region of the input image may be automatically normalized or rescaled by the aforesaid algorithms and the location of the center of the detected eyes.

Figure 3:
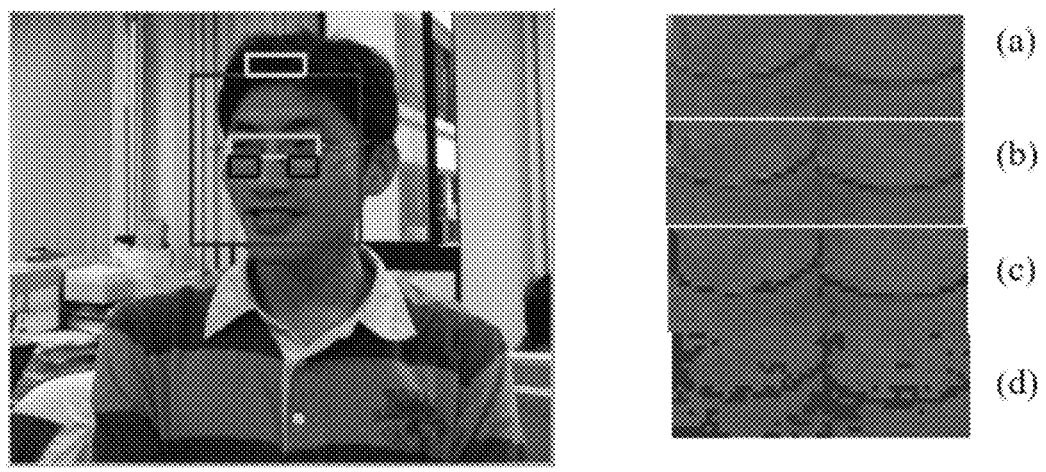
FIG. 3 illustrates two rectangular areas below the determined eyes region defining the training sets for selecting skin regions.
Figure 4:
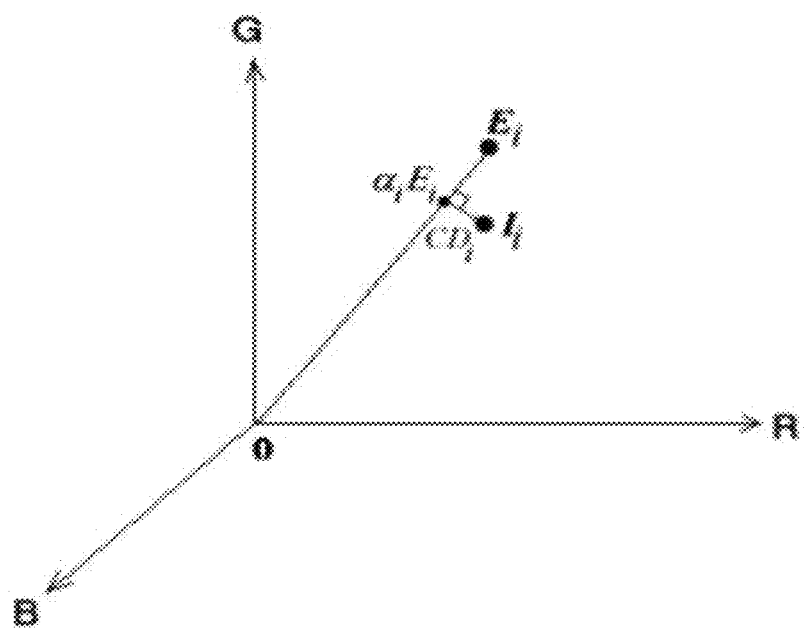
FIG. 4 illustrates the brightness and chromaticity coordinate values of a pixel with a particular location (xi, yi)

The present invention further provides a method for skin region segmentation 13 and hair region segmentation 14. Skin and hair generally includes shadows and thus the colors of the skin and hair appear inconsistent. The issue of the color inconsistency may solved by a shadow analysis and a color distortion analysis based on a preselected training set. In one aspect of the present invention, the skin region segmentation 13 first selects skin regions from a training set based on the two rectangular areas below the determined eyes region as shown in FIG. 3. The skin region 13 applies the shadow analysis by first assigning the actual color values Ii and expected color values Ei for the brightness and chromaticity coordinate values of pixel (xi, yi) of the pictures as shown in FIG. 4. Second, skin region segmentation 13 determines whether the regions of skin are shadowed by the following formula:

$$\alpha_i = \frac{\left(r_i * \frac{\mu_r}{\sigma_r}\right)^2 + \left(g_i * \frac{\mu_g}{\sigma_g}\right)^2 + \left(b_i * \frac{\mu_b}{\sigma_b}\right)^2}{\left(\frac{\mu_r}{\sigma_r}\right)^2 + \left(\frac{\mu_g}{\sigma_g}\right)^2 + \left(\frac{\mu_b}{\sigma_b}\right)^2}$$

where $\alpha_i$ is current brightness with respect to the actual brightness of a particular pixel $(x_i, y_i)$, $(r_i, g_i, b_i)$ is the RGB color vector of the pixel, $(\mu_r, \mu_g, \mu_b)$ is the mean color, and $(\sigma_r, \sigma_g, \sigma_b)$ is the color standard deviation of the selected training set. If $\alpha_i$ is smaller than 1 the area of skin or hair is shadowed, and if $\alpha_i$ is larger than 1, the area of skin or hair is highlighted.

The skin region segmentation 13 further calculates color distortion analysis as follows:

$$CD_i = \|I_i - \alpha_i * E_i\|$$

$$= \sqrt{\left(\frac{r_i - \alpha_i * \mu_r}{\sigma_r}\right)^2 + \left(\frac{g_i - \alpha_i * \mu_g}{\sigma_g}\right)^2 + \left(\frac{b_i - \alpha_i * \mu_b}{\sigma_b}\right)^2}$$

where $CD_i$ is the color distortion of the pixel $(x_i, y_i)$. If the computed color distortion is smaller than a preset threshold and the $\alpha_i$ falls within a predetermined range, the point matches a predetermined model and is classified within a region of the training set. The skin region is accordingly determined.

The hair region segmentation 14 determines the hair region using the same method used by the skin region segmentation 13 as disclosed above.

Some of the skin region and hair region may contain foreign objects and the foreign object may be included/excluded as a part of the region by controlling the value of the standard deviations around the mean value of the colors within a particular region. The image of the foreign objects may be excluded when the color distributions of the pixel are not within a specific standard deviation around the mean value of the training set. The skin region segmentation 13 and the hair region segmentation 14 may exclude pixels for which the standard deviation is one time, two times, or three times away from the mean value of the color distribution of training sets as shown in (b), (c) and (d) of FIG. 3, respectively. (a) of FIG. 3 is the original picture for the standard deviation training set.

Some facial regions, such as eyes, nose, and mouth may contain shadows that cannot be easily classified. When the main figures in the picture are humans, the skin region segmentation 13 and the hair region segmentation 14 may apply a face mask with the shape of a pentagon on the determined eyes, and the locations of pixels is therefore defined to be within the pentagon as skin pixels.

Hair regions may contain translucent pixels thus creating some uncertainty when applying the hair and skin segmentation algorithm. The hair region 14 therefore assumes hair regions to be adjacent to a skin region determined by the skin region segmentation 13. The possible location of hair regions may be restricted. In addition, uncertain hair regions may be classified as unknown areas or may be reclassified by assigning each pixel of the uncertain hair region as possibly belonging to the foreground, background, or unknown area, similar to the technique used in the process discussed below.

The body mask application process 120 determines a possible body region of a body mask based on a training process to collect the information of the eye widths detected by eye detection 12, the position of menton detected by face detection 11, and the relative body pixels for all images from the training sets. The body mask application process 120 automatically aligns and selects a body region of the input image based on such collected information. The body mask application process 120 thus determines the location probabilities of the body region $W(x_i, y_i)$ of a body mask and may rescale the selected body region. In one embodiment of the present invention, the bottom of the body mask can be extended to the bottom of a mask if the figures in the picture include humans.

Figure 2:
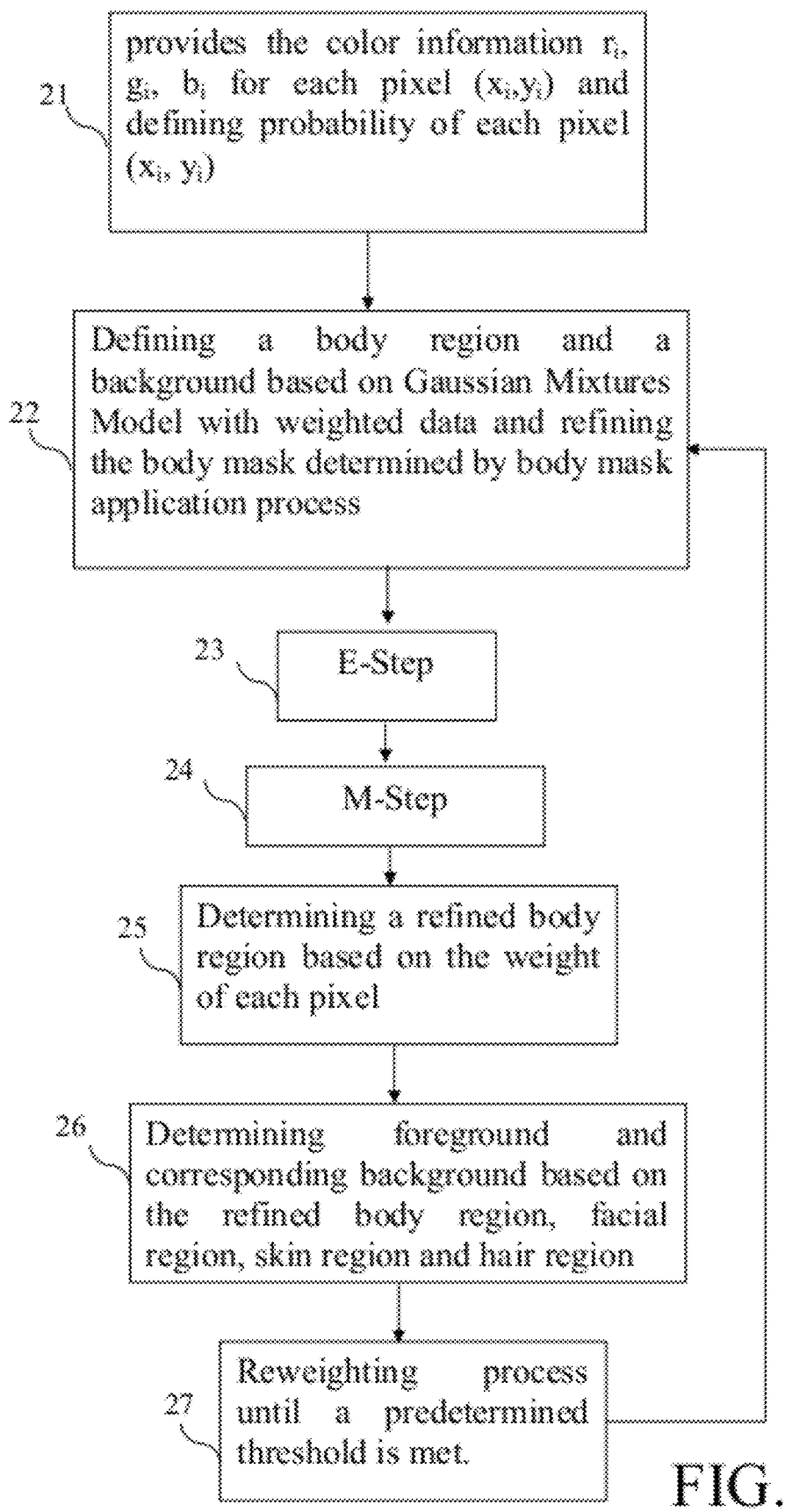
FIG. 2 illustrates the flow chart of functions of the iterative body/background segmentation step in FIG. 1.

As shown in FIG. 2, Iterative Body/Background segmentation 121 provides the color information $r_i$, $g_i$, $b_i$ for each pixel $(x_i, y_i)$ in step 21. The probabilities of each pixel $(x_i, y_i)$ belonging to body or background regions are thus defined as p(background=0|$x_i, y_i, r_i, g_i, b_i$) or p(background=1|$x_i, y_i, r_i, g_i, b_i$). If each pixel is conditionally independent of the others, the probability may be rewritten as:

$$p(\text{Background} = 1 \mid x_i, y_i, r_i, g_i, b_i) =$$
$$\frac{p(x_i, y_i \mid \text{Background} = 1) * p(r_i, g_i, b_i \mid \text{Background} = 1) * p(\text{Background} = 1)}{p(x_i, y_i, r_i, g_i, b_i)}$$

According to Bayes' theorem the probability of each pixel belonging to the background thus becomes:

$$p(\text{Background} = 1 \mid x_i, y_i, r_i, g_i, b_i) =$$
$$\frac{p(\text{Background} = 1 \mid x_i, y_i) * p(x_i, y_i)}{p(\text{Background} = 1)} *$$
$$\frac{p(r_i, g_i, b_i \mid \text{Background} = 1) * p(\text{Background} = 1)}{p(x_i, y_i, r_i, g_i, b_i)} =$$

$$p(\text{Background} = 1 \mid x_i, y_i) * p(x_i, y_i) * \frac{p(r_i, g_i, b_i \mid \text{Background} = 1)}{p(x_i, y_i, r_i, g_i, b_i)}$$

Similarly, the probability of each pixel belonging to the body region can be expressed as follows:

$$p(\text{Background} = 0 \mid x_i, y_i, r_i, g_i, b_i) =$$
$$p(\text{Background} = 0 \mid x_i, y_i) * p(x_i, y_i) * \frac{p(r_i, g_i, b_i \mid \text{Background} = 0)}{p(x_i, y_i, r_i, g_i, b_i)}$$

As shown in FIG. 2, step 22 defines a body region and a background to be represented by the color of each pixel based on Gaussian Mixture Model (GMM model) and by a body mask determined by the body mask application process 120. Step 22 uses the same color information $r_i$, $g_i$, $b_i$ for each pixel $(x_i, y_i)$ and the probability of each pixel $(x_i, y_i)$ as defined in step 21. By calculating the frequency of a normalized pixel location inside the body mask determined by the training date set, the probability function $w_i = \rho(\text{background}=0 \mid x_i, y_i)$ may represent the probability of the pixel belonging to the body region. When $w_i = 1$, the pixel is within the body region. The probability density function of a two dimensional multivariate normal distribution can be illustrated by:

$$p_X(x_1, x_2, \ldots, x_N) = \frac{1}{2\pi\sqrt{|\Sigma|}} e^{-\frac{1}{2}(x-\mu)^T \Sigma^{-1}(x-\mu)}$$

A pixel $\rho(ri, gi, bi)$ through a liner combination of the density function above may be represented by:

$$p(r_i, g_i, b_i) = \sum_{j=1}^{J} p(r_i, g_i, b_i \mid j) P_j$$

The summation of the $P_j$ is equal to 1. Accordingly, there are J Gaussian distributions contributing to the color distribution $\rho(r_i, g_i, b_i)$. The formula implies that a pixel i with color $(r_i, g_i, b_i)$ may have a color distribution drawn from one of the J Gaussian distributions with probability $P_j$, $j=1, 2, \ldots, J$. The probability of a pixel belonging to the body region is represented by $w_i = \rho(\text{background}=0 \mid x_i, y_i)$. When $w_i = 1$, the pixel belongs to the body region. Each color pixel of the body mask determined above may be included into the training samples for GMM model estimation. In the to training process, the pixels to be included can be determined manually by identifying possible color distributions within a body region manually, or by utilizing the concept of Expectation Maximization algorithm (EM algorithm) automatically, as discussed below. Given the set X of the N training vectors, the typical Maximum Likelihood (ML) formulation maximizes the likelihood function $\Pi_{i=1}^{N} p(x_i \mid \Theta)$ to compute a specific estimation of the unknown parameter $\Theta$.

As shown in FIG. 2, step 22 further applies GMM-WD to refine the body region determined by the body mask application 120 to reduce the errors when the figures of the picture have poses different from the poses of the training sets. The GMM with weighted data is then followed by an expectation step (E-step) 23 and a maximization step (M-step) 24. A weight function, $W(\rho_i, w_i) = \rho_i^{w_i}$ is proposed in one of the embodiment of the present invention for the M-step 24. The weight function gives higher weight $w_i$ to a sample point $x_i$ to retain the influence on ML estimation. When $w_i$ is close to zero, the weight function is close to 1 and thus has little effect during the maximization step. Other weight functions may be adopted as long as the functions meet the conditions mentioned above.

Assuming the weight function $W(\rho_i, w_i) = \rho_i^{w_i}$ is adopted in the present invention, the likelihood function becomes:

$$p(X \mid \theta) = \prod_{i=1}^{N} W(p(x_i \mid \Theta), w_i)$$
$$= \prod_{i=1}^{N} p(x_i \mid \Theta)^{w_i}$$

The parameters can be determined when the likelihood function takes its maximum values, i.e.

$$\hat{\theta}_{ML} = \arg\max_{\theta} \prod_{i=1}^{N} p(x_i \mid \Theta)^{w_i}$$

If $J_i$ denotes the mixture from which $x_i$ is generated, the log-likelihood function becomes:

$$L(\theta) = \ln \prod_{i=1}^{N} p(x_i \mid \Theta)^{w_i}$$
$$= \sum_{i=1}^{N} \ln(p(x_i \mid \Theta)^{w_i})$$
$$= \sum_{i=1}^{N} w_i \ln(p(x_i \mid j_i; \theta) P_{j_i})$$

Where $j_i$ takes the integer values within the interval $[1, J]$ and the unknown parameter vector is denoted by $\Theta = [\theta^T, P^T]^T$. Thus the EM algorithm for parameters can be described by E-step 23 as illustrated below. Assuming the $\theta(t)$ is available at the t+1 step of an iteration, the expected value can be:

$$Q(\Theta; \Theta(t)) = E\left[\sum_{i=1}^{N} w_i \ln(p(x_i \mid j_i; \theta) P_{j_i})\right]$$
$$= \sum_{i=1}^{N} w_i \sum_{j_i=1}^{J} P(j_i \mid x_i; \Theta(t)) \ln(p(x_i \mid j_i; \theta) P_{j_i})$$

Dropping the index i from $j_i$, and summing up all possible J values of $j_i$, an auxiliary objective function can be derived as below:

$$Q(\theta^t; \theta^{t+1}) = \sum_{i=1}^{N} w_i \sum_{j=1}^{J} \frac{p(x_i \mid \theta_j^t) P_j^t}{\sum_{j'} p(x_i \mid \theta_{j'}^t) P_{j'}^t} \ln(p(x_i \mid \theta_j^{t+1}) P_j^{t+1}))$$

After the expectation E-step 23 is calculated, the steps proceed to M-step 24. The mixture weights are thus normalized in M-Step 24 as below:

$$\sum_j P_j^{t+1} = 1$$

The $Q(\theta^t, \theta^{t+1})$ is maximized and thus makes its first derivative to zero:

$$\theta^{t+1}: \frac{\partial Q(\theta^t; \theta^{t+1})}{\partial \theta^{t+1}} = 0$$

A Lagrange multiplier $\mu$ is introduced to solve the partial derivative equation as below:

$$Q(\theta^t; \theta^{t+1}) = \sum_{i=1}^{N} w_i \sum_{j=1}^{J} \frac{p(x_i | \theta_j^t) P_j^t}{\sum_{j'} p(x_i | \theta_{j'}^t) P_{j'}^t} \ln(p(x_i | \theta_j^{t+1}) P_j^{t+1})) +$$

$$\mu\left(1 - \sum_j P_j^{t+1}\right)$$

The Lagrange Multiplier $\mu$ can be determined as:

$$1 = \sum_j P_j^{t+1}$$

$$= \frac{1}{\mu} \sum_{i=1}^{N} w_i \frac{\sum_j p(x_i | \theta_j^t) P_j^t}{\sum_{j'} p(x_i | \theta_{j'}^t) P_{j'}^t}$$

Accordingly, by maximizing $Q(\theta^t, \theta^{t+1})$ and making its first derivative to zero, we derive an iterative update scheme for the mixture weight:

$$P_j^{t+1} = \frac{1}{\sum_{i=1}^{N} w_i} \sum_{i=1}^{N} w_i \frac{p(x_i | \theta_j^t) P_j^t}{\sum_{j'} p(x_i | \theta_{j'}^t) P_{j'}^t}$$

The present invention further defines an auxiliary function to measure the contribution of a training sample xi to the mixture j as below:

$$\gamma_{i,j}^t = \frac{p(x_i | \theta_j^t) P_j^t}{\sum_{j'} p(x_i | \theta_{j'}^t) P_{j'}^t}$$

$$\mu_j^{t+1} = \frac{1}{\sum_{i=1}^{N} \gamma_{i,j}^t} \sum_{i=1}^{N} \gamma_{i,j}^t x_i$$

$$\sum_j^{t+1} = \frac{1}{\sum_{i=1}^{N} \gamma_{i,j}^t} \sum_{i=1}^{N} \gamma_{i,j}^t (x_i - \mu_j)(x_i - \mu_j)^T$$

As shown in FIG. 2, we may assign each pixel a weight in step 25 based on the proposed weight function combined with the Expectation Maximization algorithm (E-step 23 and M-step 24), a body region defined by the GMM-WD in step 22, and the formula and conditions mentioned above. A body mask therefore is determined not only based on the frequency of a pixel color appearing within a body region but also based on the weight assigned for such pixel. The weight assigned in step 25 may be derived iteratively and automatically. A body mask accordingly can be obtained based on the weight assigned without pre-selecting a particular body region of the training sets. Therefore, a wide variety of body regions or poses may be automatically determined without manual adjustments. In step 26, foreground and corresponding background are determined based on the refined body region, facial region, skin region and hair region.

As shown in FIG. 2, after the body region is determined, Iterative Body/Background Segmentation 121 further determines the corresponding background in step 25 based on setting the probability of head region, including eyes, faces, hair region, to be zero and computing the difference between $w_i$ and 1 for each pixel. The probability of each pixel belonging to the background may be computed as follows:

$$p(r_i, g_i, b_i | \text{Background} = 0) =$$

$$\sum_{j_{body}=1}^{J_{body}} P_{j_{body}} * p(r_i, g_i, b_i | \text{Background} = 0; j_{body})$$

$$p(r_i, g_i, b_i | \text{Background} = 1) =$$

$$\sum_{j_{background}=1}^{J_{background}} P_{j_{background}} * p(r_i, g_i, b_i | \text{Background} = 1; j_{background})$$

$J_{body}$ and $J_{background}$ are the numbers of Gaussian Mixtures for the body and background color models respectively, and $P_{jbody}$ and $P_{jbackground}$ are the mixture weights of the body and background GMM models respectively.

As shown in FIG. 2, the foreground and background may be further refined by reweighting process 27 of the mixtures based on the color differences between the foreground and the background of the picture. For example, if the body region of the foreground is selected to be reweighted, a discriminant value for body region $d_{jbody}$ is defined to estimate its similarity to the background mixtures as below:

$$d_{j_{body}} = \min_{j_{background}=1,2,\ldots,J_{background}} \frac{|\mu_{j_{body}} - \mu_{j_{background}}|}{\sqrt{\lambda_{j_{body}} + \lambda_{j_{background}}}}$$

$\lambda_{jbody}$ is the sum of the eigenvalues $\Sigma_{jbody}'$, and $\lambda_{jbackground}$ is the sum of the eigenvalues of $\Sigma_{jbackground}$. The body mixture with less color similarity to the background mixtures obtains a larger discriminant value. The new mixture weight is defined as below:

$$P'_{j_{body}} = \frac{d_{j_{body}}}{\sum_{j_{body}=1}^{J_{body}} d_{j_{body}}}$$

A new body mask $w'_i$ may be derived based on the new mixture weights and the original density function as a new hypothetical body mask. Since the new mixture weights are not optimal with respect to the parameter of the original density functions, the process returns to step 22 and replaces the body mask determined with the new hypothetical body mask, then applies the GMM with weighted data model again to refine and determine the background and body based on the new hypothesized body mask w'i, i.e., $$p(\text{Background} = 0 \mid i)' = \sum_{j_{body}=1}^{J_{body}} p(r_i, g_i, b_i \mid \text{Background} = 0; j_{body}) * P'_{j_{body}}$$

The reweighting process may be applied to any region of the picture but is not limited to the body region of the foreground or the background. In one of the preferred embodiments, a pixel i with $w_i$<0.9 may be rejected in favor of a better criterion for comparison. In general, applying the reweighting once is sufficient in all mixtures.

As shown in FIG. 1, a tri-map 15 is generated that combines the foreground region, the background region, and the unknown region as discussed below. The foreground region, for example, may include, but is not limited to, head region, hair region, and body region as mentioned above. The probability of a pixel i belonging to the body and the probability of a pixel belonging to the background may be illustrated as below:

$$\rho_i = \frac{p(\text{Background} = 0 \mid x_i, y_i, r_i, g_i, b_i)}{p(\text{Background} = 1 \mid x_i, y_i, r_i, g_i, b_i)}$$

$$\rho_i = \frac{p(\text{Background} = 0 \mid x_i, y_i) * p(r_i, g_i, b_i \mid \text{Background} = 0)}{p(\text{Background} = 1 \mid x_i, y_i) * p(r_i, g_i, b_i \mid \text{Background} = 1)}$$

Based on the information collected from training sets, two threshold values $T_1$ and $T_2$ are predetermined. If $\rho_i > T_1$, pixel i belongs to the body region; if $\rho_i < T_2$, pixel i belongs to the background region; otherwise pixel i is assigned to the unknown region.

Image matting 16 combines the tri-map to generate an alpha matte based on the determined facial region, eyes region, and a closed-form matting algorithm proposed by Anat Levin, Dani Lischinski, and Yair Weiss (see IEEE transactions on Pattern Analysis and Machine Intelligence (PAMI), Vol. 30, No. 2, 2008).

Image composition 17 collects each segmented part of the picture and the new background image or other pictures as shown in FIG. 1. In one preferred embodiment of the present invention, background substitution 18 may replace the background of the original image with a new background image.

Figure 5:
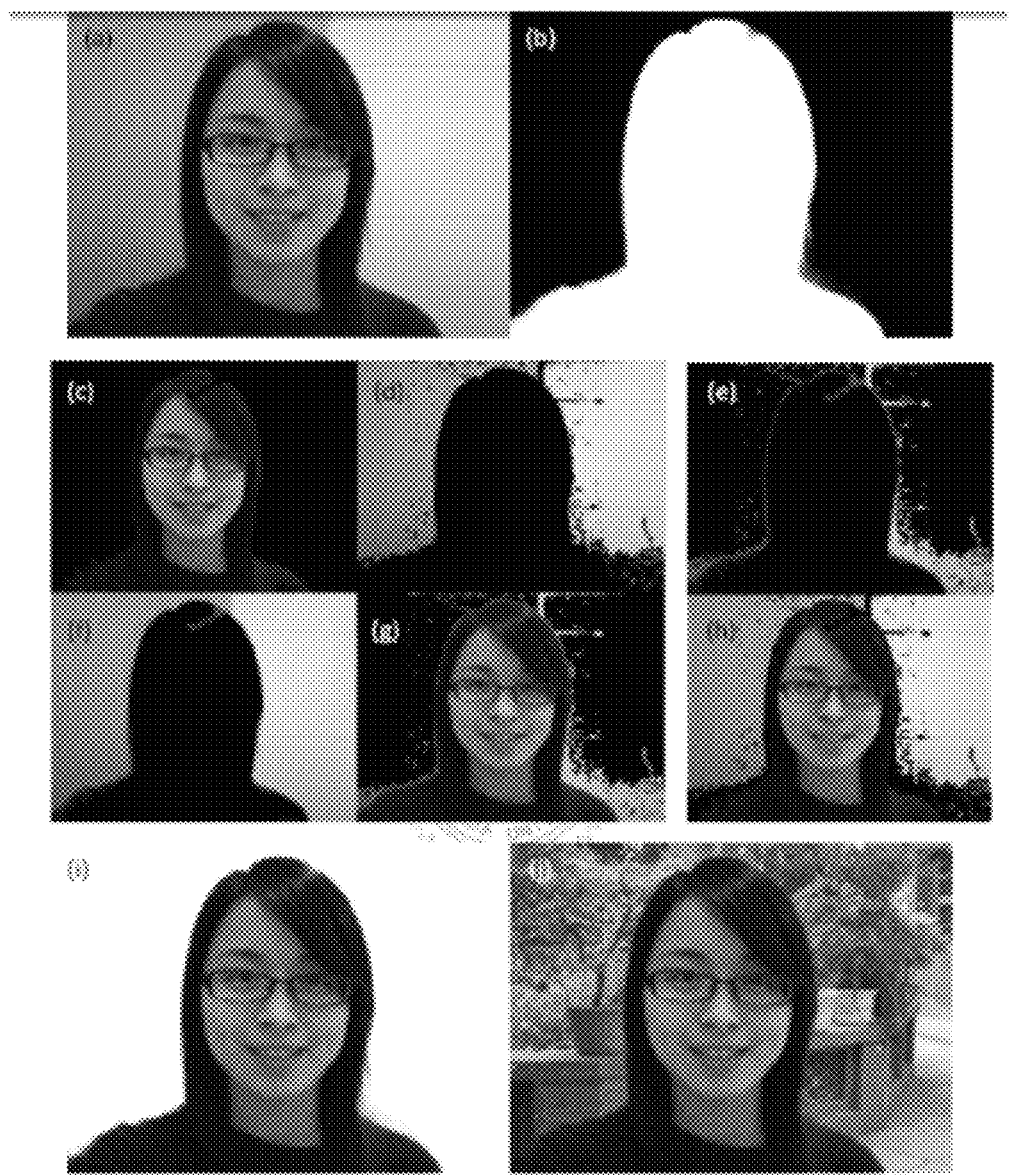
FIG. 5 illustrates the segmentation of a picture into foreground, background, and unknown regions in accordance with the present invention and a substitution of its background.

In one embodiment of the present invention, namely, the probabilistic body mask, body regions of 36 human images are manually labeled as the ground truth training sets to train the location of the prior model. Human images are detected by the face and eye detectors based on the enhanced state-of-the-art AdaBoost detectors mentioned above. Next, the prior mask is geometrically aligned and cropped to a proper size. The cropped prior mask should not be larger than the input image. In FIG. 5, the first row (i.e., (a) and (b)) comprises the input human image and the estimated alpha matte. The tri-map computed by the present invention is presented in the second row (i.e., (c)-(e)). The third row (i.e., (f) and (h)) is complementary to the tri-map above. The fourth row (i.e., (i) and (j)) shows the substitution or the matting result for different backgrounds.

The average proportion of the elapsed time of body/background segmentation to the total elapsed time is more than 85%. The bottleneck of the computational performance is attributed to the time-consuming GMM model parameter estimation for iterative body/background segmentation. To speed up the process, the following efficiency enhancement strategies are provided:

Strategy 1 skips the reweighting process if the body/background mask can provide a reasonable hypothesis. In other words, mixture reweighting is not necessary for every input image.

Strategy 2 downsamples the training sets which can accelerate the process of GMM. When all the pixels with nontrivial body/background mask values are introduced to estimate the parameters of GMM, the process becomes very time-consuming. Thus, downsampling is a reasonable technique to reduce the computational cost.

Strategy 3 sets the maximum number of iterations of the EM algorithm to 50. The EM algorithm may converge to a local maximum of the observed data likelihood function depending on the initial values. In some cases, the EM algorithm converges slowly; hence we can simply terminate the iterative process if it has not converged after a predetermined number of iterations. Other methods have been proposed to accelerate the traditional EM algorithm, such as utilizing conjugate gradient or modifying the Newton-Raphson techniques.

The strategies as mentioned above can be performed without substantial loss of precision of the picture segmentation. Based on an input image shown in FIG. 5, each proposed strategy reduces the time required for finishing the process of substituting a background to a white background. The results are illustrated in the table below:

| Elapsed time | | Body and background segmentation | Image matting | Total elapsed time |
|---|---|---|---|---|
| Original elapsed time | | 50.68 sec | 5.77 sec | 59.14 sec |
| Strategy 1 | | 24.19 sec | 43.26 sec | 70.14 sec |
| Strategy 2: Downsample by a factor of | 2 | 21.41 sec | 6.15 sec | 30.25 sec |
| | 3 | 10.80 sec | 6.50 sec | 19.99 sec |
| | 4 | 8.96 sec | 10.05 sec | 21.70 sec |
| Strategy 3: maximum of iterations | 30 | 46.70 sec | 6.13 sec | 55.52 sec |
| | 10 | 21.23 sec | 7.96 sec | 31.88 sec |
| | 1 | 8.28 sec | 5.6 sec | 16.57 sec |

The above-described embodiments of the present invention are intended to be illustrative only. Those skilled in the art may devise numerous alternative embodiments without departing from the scope of the following claims. Accordingly, the scope of the present invention shall be not limited to embodiments disclosed but shall be properly determined by the claims set forth below.

What is claimed is:

1. A method for picture segmentation comprising:
   determining a first foreground of a picture based on a first predetermined mask;
   applying Gaussian Mixture Models with weighted data (GMM-WD) to the first foreground to generate a second foreground;
   determining a first background of the picture based on the second foreground;
   applying the GMM-WD to the first background to generate a second background; and determining a first region based on the second background and the second foreground;
wherein the first predetermined mask is determined by a step comprising:
  determining a first face region;
  determining an eyes region;
  determining a skin region;
  determining a second face region based on the eyes region and the skin region by a color distortion analysis comparing with the first face region;
  determining a hair region;
  determining a body region;
  wherein the predetermined mask is the combination of the second face region, the hair region, and the body region.

2. The method of claim 1, wherein the GMM-WD comprises a weighted function and weighted data, when the weighted data is close to zero, the weight function is close to 1 during a maximization step of the GMM-WD.

3. The method of claim 1, wherein the GMM-WD further comprises an expectation maximization algorithm.

4. The method of claim 3, wherein the picture segmentation is accelerated by terminating an iterative process of the expectation maximization algorithm.

5. The method of claim 1, wherein the first predetermined mask is determined based on training sets.

6. The method of claim 1, wherein the body region is refined by applying GMM-WD.

7. The method of claim 1, wherein the body region is extended to the bottom of the picture.

8. The method of claim 1, wherein the hair region is presumed to be adjacent to the skin region.

9. The method of claim 1, further comprising:
  determining a second predetermined mask using a reweighting process;
  determining a third foreground of the picture based on the second predetermined mask;
  applying the GMM-WD to the third foreground to generate a fourth foreground;
  determining a third background of the picture based on the fourth foreground;
  applying the GMM-WD to the third background to generate a fourth background; and
  determining a second region based on the fourth background and the fourth foreground.

10. The method of claim 9, wherein the reweighting process comprises weights applicable to a density function of GMM-WD.

11. The method of claim 10, wherein the reweighting process determines the weights based on a discriminant value thereby smaller color similarity to the third background obtains a larger discriminant value.

12. The method of claim 9, wherein the picture segmentation is accelerated by bypassing the reweighting process.

13. The method of claim 1, wherein the picture segmentation is accelerated by downsampling the predetermined mask.

14. A method of processing an image matting of a picture comprising:
  identifying a foreground of the picture;
  identifying a background of the picture;
  applying Gaussian Mixture Models with weighted data (GMM-WD) to the foreground and the background to generate a second foreground and a second background;
  identifying a first region by excluding the second foreground and the second background from the picture; and
  performing an image matting process based on the second foreground, second background, and the first region;
  wherein the second foreground, the second background, and the first region is substituted by other figures.

15. The method of claim 14, wherein the figures are monochrome, another picture, or another background.

16. The method of claim 14, wherein the picture after the substitution may be refined by a reweighting process wherein the reweighting process comprises weights applicable to a density function of GMM-WD and is based on a discriminant value to determine the weights thereby a smaller color similarity to the third background obtains a larger discriminant value.

17. A system of automatic generation of a tri-map of a picture comprising:
  a measure for identifying a first foreground of the picture based on a predetermined mask;
  a measure for identifying a first background of the picture based on the predetermined mask;
  a measure for applying Gaussian Mixture Models with weighted data (GMM-WD) to the first foreground and the first background to generate a second foreground and a second background; and
  a measure for identifying a first region by excluding the second foreground and the second background from the picture;
  wherein a reweighting process is applicable to a density function of GMM-WD.

18. The system of claim 17, wherein the reweighting process determines weights based on a discriminant value thereby a smaller color similarity to the third background obtains a larger discriminant value.

* * * * *